US012701168B2

(12) United States Patent　　(10) Patent No.:　　US 12,701,168 B2
Park　　(45) Date of Patent:　　Aug. 4, 2026

(54) WIRELESS POWER TRANSMISSION DEVICE, WIRELESS POWER TRANSMISSION METHOD BY WIRELESS POWER TRANSMISSION DEVICE, WIRELESS POWER RECEPTION DEVICE, AND WIRELESS POWER RECEPTION METHOD BY WIRELESS POWER RECEPTION DEVICE

(71) Applicant: LG ELECTRONICS INC., Seoul (KR)

(72) Inventor: Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 714 days.

(21) Appl. No.: 17/927,263

(22) PCT Filed: May 24, 2021

(86) PCT No.: PCT/KR2021/006444
　§ 371 (c)(1),
　(2) Date: Nov. 22, 2022

(87) PCT Pub. No.: WO2021/235908
　PCT Pub. Date: Nov. 25, 2021

(65) Prior Publication Data
　US 2023/0246483 A1　Aug. 3, 2023

(30) Foreign Application Priority Data
　May 22, 2020　(KR) ........................ 10-2020-0061446

(51) Int. Cl.
　*H04L 67/00*　(2022.01)
　*H02J 50/10*　(2016.01)
　(Continued)

(52) U.S. Cl.
　CPC .............. *H04L 67/34* (2013.01); *H02J 50/10* (2016.02); *H02J 50/40* (2016.02); *H02J 50/90* (2016.02); *H04L 67/303* (2013.01)

(58) Field of Classification Search
　CPC ........ H04L 67/34; H04L 67/303; H02J 50/10; H02J 50/40; H02J 50/90
　(Continued)

(56) References Cited

U.S. PATENT DOCUMENTS 10,840,747 B2 * 11/2020 Shichino ............... H04W 76/14
11,005,297 B2 * 5/2021 Shichino ................ H02J 50/10
　(Continued)

FOREIGN PATENT DOCUMENTS

KR　　20130092152　　8/2013
KR　　20170044495　　4/2017
　(Continued)

OTHER PUBLICATIONS

PCT International Application No. PCT/KR2021/006444, International Search Report dated Sep. 6, 2021, 4 pages.

*Primary Examiner* — Jared Fureman
(74) *Attorney, Agent, or Firm* — LEE, HONG, DEGERMAN, KANG & WAIMEY

(57) ABSTRACT

A wireless power transmission method by a wireless power transmission device according to an embodiment of the present specification comprises: a ping step of transmitting a digital ping and receiving a response to the digital ping from a wireless power reception device; a configuration step of receiving, from the wireless power reception device, a configuration packet including information on elements of an initial power transmission contract; a negotiation step of receiving, from the wireless power reception device, information on elements of an extended power transmission contract for updating the initial power transmission contract (Continued)

to the extended power transmission contract; and a power transmission step of transmitting wireless power to the wireless power reception device on the basis of the extended power transmission contract, wherein in the power transmission step, a request packet for requesting a specific packet is received from the wireless power reception device, and in response to the request packet, the specific packet is transmitted to the wireless power reception device.

15 Claims, 21 Drawing Sheets

(51) Int. Cl.
H02J 50/40 (2016.01)
H02J 50/90 (2016.01)
H04L 67/303 (2022.01)

(58) Field of Classification Search
USPC .......................................... 320/108; 307/107
See application file for complete search history.

(56) References Cited

U.S. PATENT DOCUMENTS

| | | | | |
|---|---|---|---|---|
| 11,146,117 | B2 * | 10/2021 | Song ........................ | H02J 50/90 |
| 11,876,872 | B2 * | 1/2024 | Lee .......................... | H04L 69/03 |
| 12,074,456 | B2 * | 8/2024 | Iwase ................. | H02J 7/00034 |
| 12,088,122 | B2 * | 9/2024 | Park ........................ | H02J 50/80 |
| 12,170,449 | B2 * | 12/2024 | Kim ........................ | H02J 50/90 |
| 2016/0372977 | A1 | 12/2016 | Nago | |
| 2025/0125663 | A1 * | 4/2025 | Kim ........................ | H02J 50/80 |
| 2025/0219470 | A1 * | 7/2025 | Park .......................... | H02J 7/02 |
| 2025/0219471 | A1 * | 7/2025 | Park .......................... | H02J 7/02 |

FOREIGN PATENT DOCUMENTS

| | | | | |
|---|---|---|---|---|
| KR | 20180121135 | | 11/2018 | |
| KR | 20190082891 | | 7/2019 | |
| KR | 20190112979 | A * | 10/2019 | .............. H02J 50/80 |
| WO | WO-2022135672 | A1 * | 6/2022 | .............. H02J 50/80 |

* cited by examiner

FIG. 3b

| | b7 | b6 | b5 | b4 | b3 | b2 | b1 | b0 |
|---|---|---|---|---|---|---|---|---|
| Byte 0 | Application Profile | | | | | | | |
| Byte 1 | Version | | | | | | | |
| Byte 2-N-1 | Profile-specific data | | | | | | | |

|  | $b_7$ | $b_6$ | $b_5$ | $b_4$ | $b_3$ | $b_2$ | $b_1$ | $b_0$ |
|---|---|---|---|---|---|---|---|---|
| $B_0$ | '00' | | Reference Power | | | | | |
| $B_1$ | Reserved | | | | | | | |
| $B_2$ | ZERO | AI | Reserved | OB | ZERO | Count | | |
| $B_3$ | Window Size | | | | Window Offset | | | |
| $B_4$ | Neg | Pol | Depth | | Buffer Size | | | Dup |

FIG. 14

| | $b_7$ | $b_6$ | $b_5$ | $b_4$ | $b_3$ | $b_2$ | $b_1$ | $b_0$ |
|---|---|---|---|---|---|---|---|---|
| $B_0$ | requested Power Transmitter Data Packet | | | | | | | |

FIG. 15

| | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved | | Negotiable Load Power | | | | | |
| $B_1$ | Reserved | | Potential Load Power | | | | | |
| $B_2$ | Dup | AR | OB | Buffer Size | | | WPID | NRS |

FIG. 20

| | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved | | | FO Presence Probability | | | Request | |

WIRELESS POWER TRANSMISSION DEVICE, WIRELESS POWER TRANSMISSION METHOD BY WIRELESS POWER TRANSMISSION DEVICE, WIRELESS POWER RECEPTION DEVICE, AND WIRELESS POWER RECEPTION METHOD BY WIRELESS POWER RECEPTION DEVICE

CROSS-REFERENCE TO RELATED APPLICATIONS

This application is the National Stage filing under 35 U.S.C. 371 of International Application No. PCT/KR2021/006444, filed on May 24, 2021, which claims the benefit of earlier filing date and right of priority to Korean Application No. 10-2020-0061446, filed on May 22, 2020, the contents of which are all incorporated by reference herein in their entirety.

BACKGROUND OF THE DISCLOSURE

Field of the Disclosure

This specification relates to a wireless power transmitter for providing wireless power, a wireless power receiver for receiving wireless power from a wireless power transmitter, a wireless power transmission method by wireless power transmission device, and a wireless power receiving method by wireless power receiving device, etc.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

SUMMARY OF THE DISCLOSURE

A technical problem of the present specification is to provide a wireless power transmission method and a wireless power reception method capable of requesting a specific packet from a wireless power transmission device in a power transmission step.

The technical problems of the present specification are not limited to the problems mentioned above, and other problems not mentioned will be clearly understood by those skilled in the art from the following description.

A method for transferring wireless power performed by a wireless power transmitter according to an embodiment of the present specification for solving the above problems comprises a ping phase of transmitting a digital ping and receiving a response to the digital ping from a wireless power receiver, a configuration phase of receiving a configuration packet including information on elements of an initial power transfer contract from the wireless power receiver, a negotiation phase of receiving information on an element of an extended power transfer contract for updating the initial power transfer contract into the extended power transfer contract from the wireless power receiver and a power transfer phase of transferring the wireless power to the wireless power receiver based on the extended power transfer contract, wherein, in the power transfer phase, a request packet requesting a specific packet is received from the wireless power receiver, the specific packet is transmitted to the wireless power receiver in response to the request packet.

A wireless power transmitter for transferring wireless power to a wireless power receiver according to an embodiment of the present specification for solving the above problems comprises a power converter configured to transmit the wireless power to the wireless power receiver by magnetic coupling with the wireless power receiver at an operating frequency and a controller configured to communicate with the wireless power receiver and to control the transfer of the wireless power, wherein the controller is configured to perform a ping phase of transmitting a digital ping and receiving a response to the digital ping from the wireless power receiver, perform a configuration phase of receiving a configuration packet including information on elements of an initial power transfer contract from the wireless power receiver, perform a negotiation phase of receiving information on an element of an extended power transfer contract for updating the initial power transfer contract into the extended power transfer contract from the wireless power receiver and perform a power transfer phase of transferring the wireless power to the wireless power receiver based on the extended power transfer contract, wherein, in the power transfer phase, a request packet requesting a specific packet is received from the wireless power receiver, the specific packet is transmitted to the wireless power receiver in response to the request packet.

A method for receiving wireless power performed by a wireless power receiver according to an embodiment of the present specification for solving the above problems comprises a ping phase of receiving a digital ping and transmitting a response to the digital ping to a wireless power transmitter, a configuration phase of transmitting a configuration packet including information on elements of an initial power transfer contract to the wireless power transmitter, a negotiation phase of transmitting information on an element of an extended power transfer contract for updating the initial power transfer contract into the extended power transfer contract to the wireless power transmitter and a power transfer phase of receiving the wireless power from the wireless power transmitter based on the extended power transfer contract, wherein, in the power transfer phase, a request packet requesting a specific packet is transmitter to the wireless power transmitter, the specific packet is received from the wireless power transmitter in response to the request packet.

A wireless power receiver for receiving wireless power from a wireless power transmitter according to an embodiment of the present specification for solving the above problems comprises a power pickup configured to receive the wireless power from the wireless power transmitter by magnetic coupling with the wireless power transmitter at an operating frequency and a controller configured to communicate with the wireless power transmitter and to control the reception of the wireless power, wherein the controller is configured to perform a ping phase of receiving a digital ping and transmitting a response to the digital ping to a wireless power transmitter, perform a configuration phase of transmitting a configuration packet including information on elements of an initial power transfer contract to the wireless power transmitter, perform a negotiation phase of transmitting information on an element of an extended power transfer contract for updating the initial power transfer contract into the extended power transfer contract to the wireless power transmitter and perform a power transfer phase of receiving the wireless power from the wireless power transmitter based on the extended power transfer contract, wherein, in the power transfer phase, a request packet requesting a specific packet is transmitter to the wireless power transmitter, the specific packet is received from the wireless power transmitter in response to the request packet.

Other specific details of this specification are included in the detailed description and drawings.

Without entering the re-negotiation phase, the wireless power receiver can request a specific data packet desired by the wireless power transmitter and receive the specific data packet even in the power transfer phase.

Effects according to the present document are not limited by the contents exemplified above, and more various effects are included in the present specification.

BRIEF DESCRIPTION OF THE DRAWINGS

FIG. 3b shows an example of a WPC NDEF in a wireless power transfer system.

FIG. 5 is a state transition diagram for describing a wireless power transfer procedure.

FIG. 6 shows a power control method according to an exemplary embodiment of the present disclosure.

FIG. 8 shows a wireless power receiver according to another exemplary embodiment of the present disclosure.

FIG. 12 is a diagram illustrating a message field of a configuration packet (CFG) of a wireless power receiver according to an embodiment.

FIG. 14 is a diagram illustrating a message field of a general request packet (GRQ) of a wireless power receiver according to an embodiment.

FIG. 15 is a diagram illustrating a message field of a capability packet (CAP) of a wireless power transmitter according to an embodiment.

FIG. 20 is a diagram illustrating a message field of a foreign object detection status packet (FOD status) of a wireless power transmitter according to an example.

DESCRIPTION OF EXEMPLARY EMBODIMENTS

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDDCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
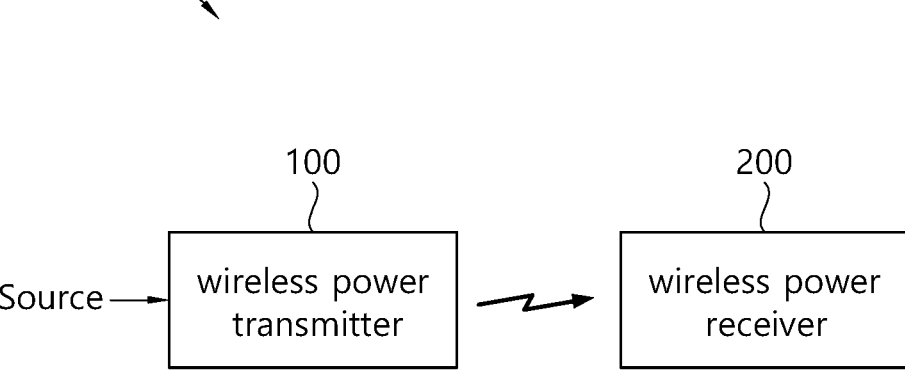
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
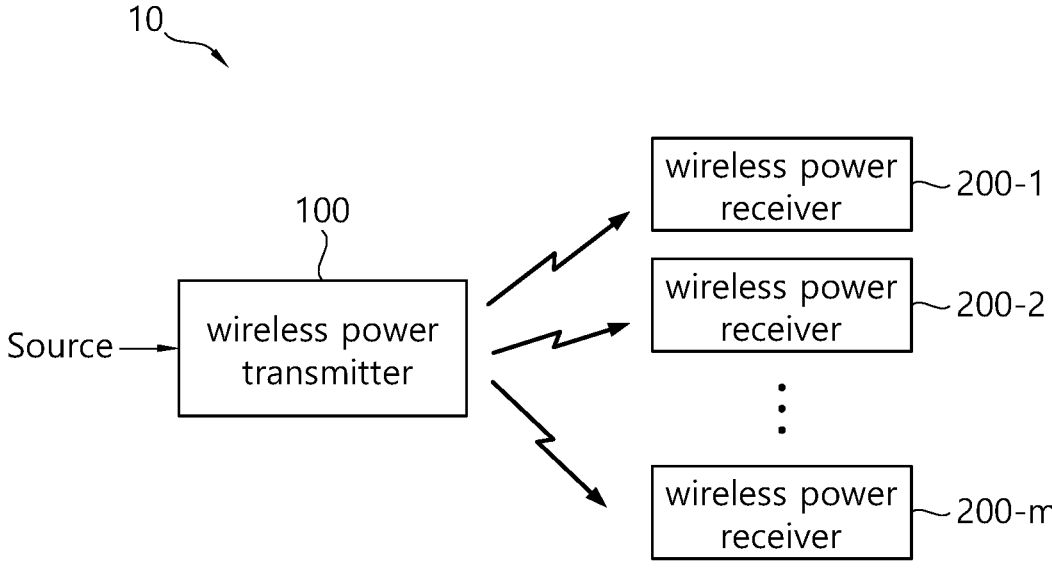
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
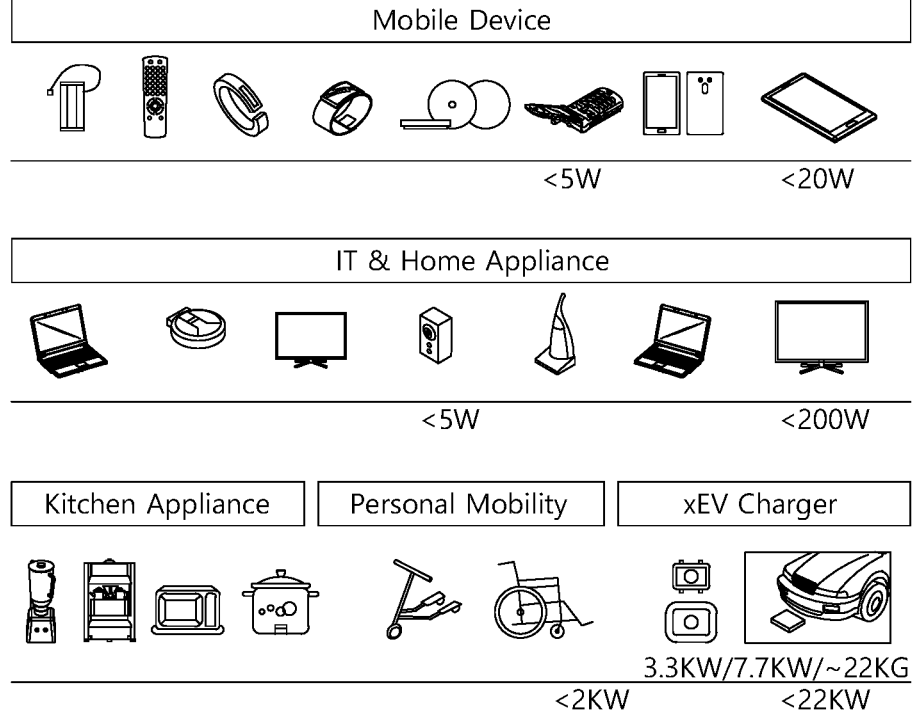
FIG. 3a shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or recharged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5W. The application of PC-1 includes wearable devices, such as smart watches.

The PC0 standard relates to wireless power transmitters and receivers providing a guaranteed power of 5W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an over-voltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ### hotel. Select "Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about check-ing identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 3b shows an example of a WPC NDEF in a wireless power transfer system.

Referring to FIG. 3b, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2W | 1x Category 1 | 1x Category 1 |
| Class 2 | 10W | 1x Category 3 | 2x Category 2 |
| Class 3 | 16W | 1x Category 4 | 2x Category 3 |
| Class 4 | 33W | 1x Category 5 | 3x Category 3 |
| Class 5 | 50W | 1x Category 6 | 4x Category 3 |
| Class 6 | 70W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5W | Feature phone |
| Category 3 | 6.5W | Smartphone |
| Category 4 | 13W | Tablet PC, Phablet |
| Category 5 | 25W | Small form factor laptop |
| Category 6 | 37.5W | General laptop |
| Category 7 | 50W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4:
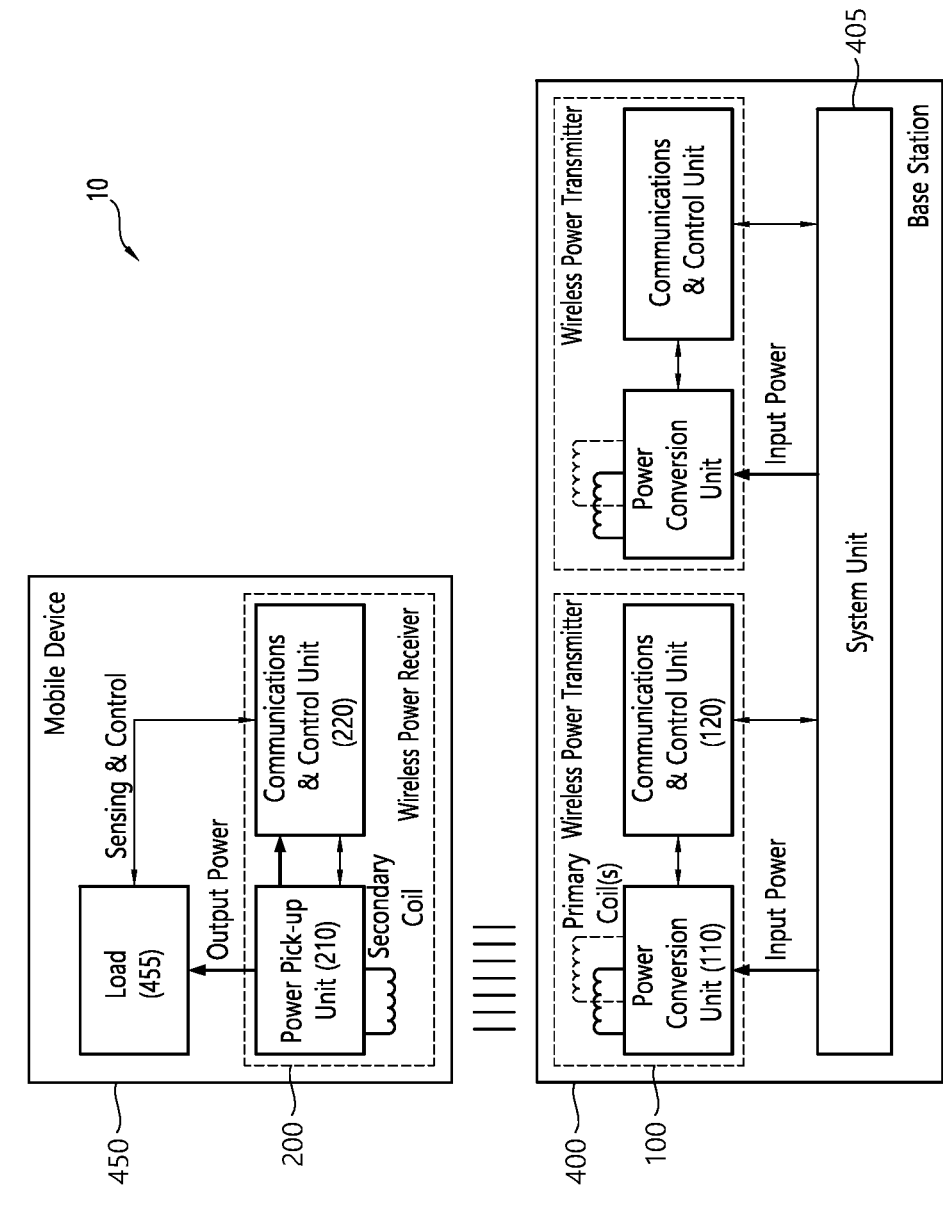
FIG. 4 is a block diagram of a wireless power transfer system according to another exemplary embodiment of the present disclosure.

FIG. 4 is a block diagram of a wireless power transfer system according to another exemplary embodiment of the present disclosure.

Referring to FIG. 4, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform TB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 5:
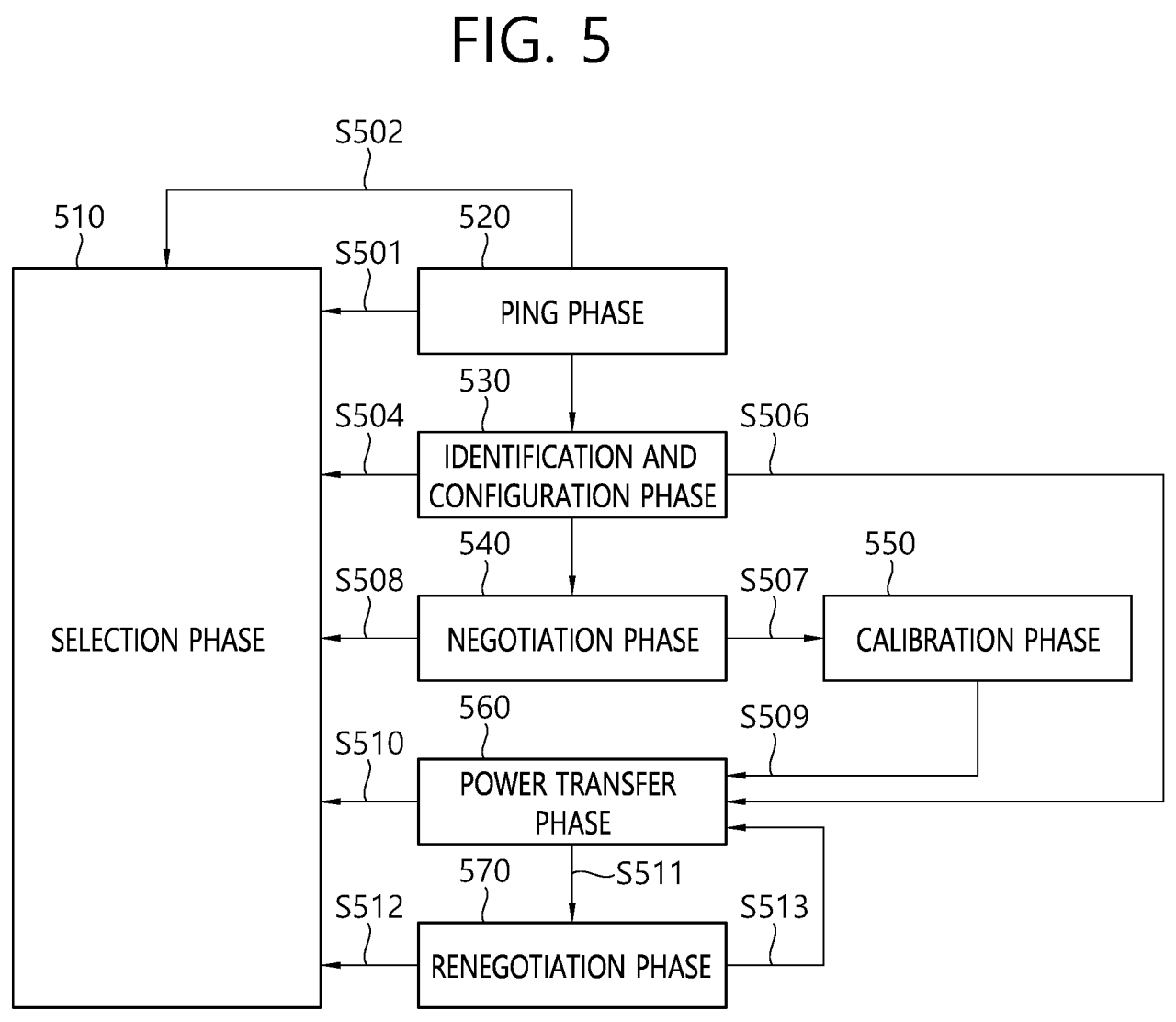

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
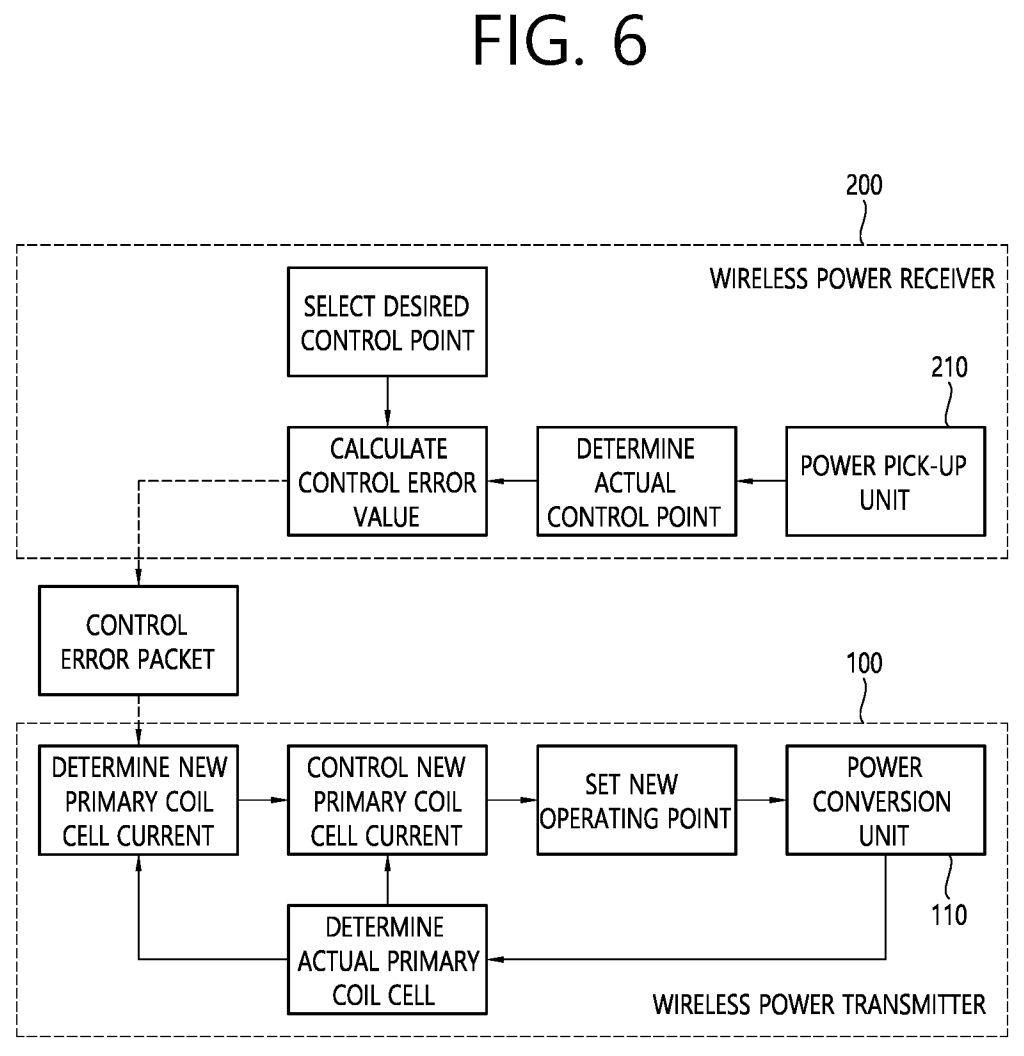

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
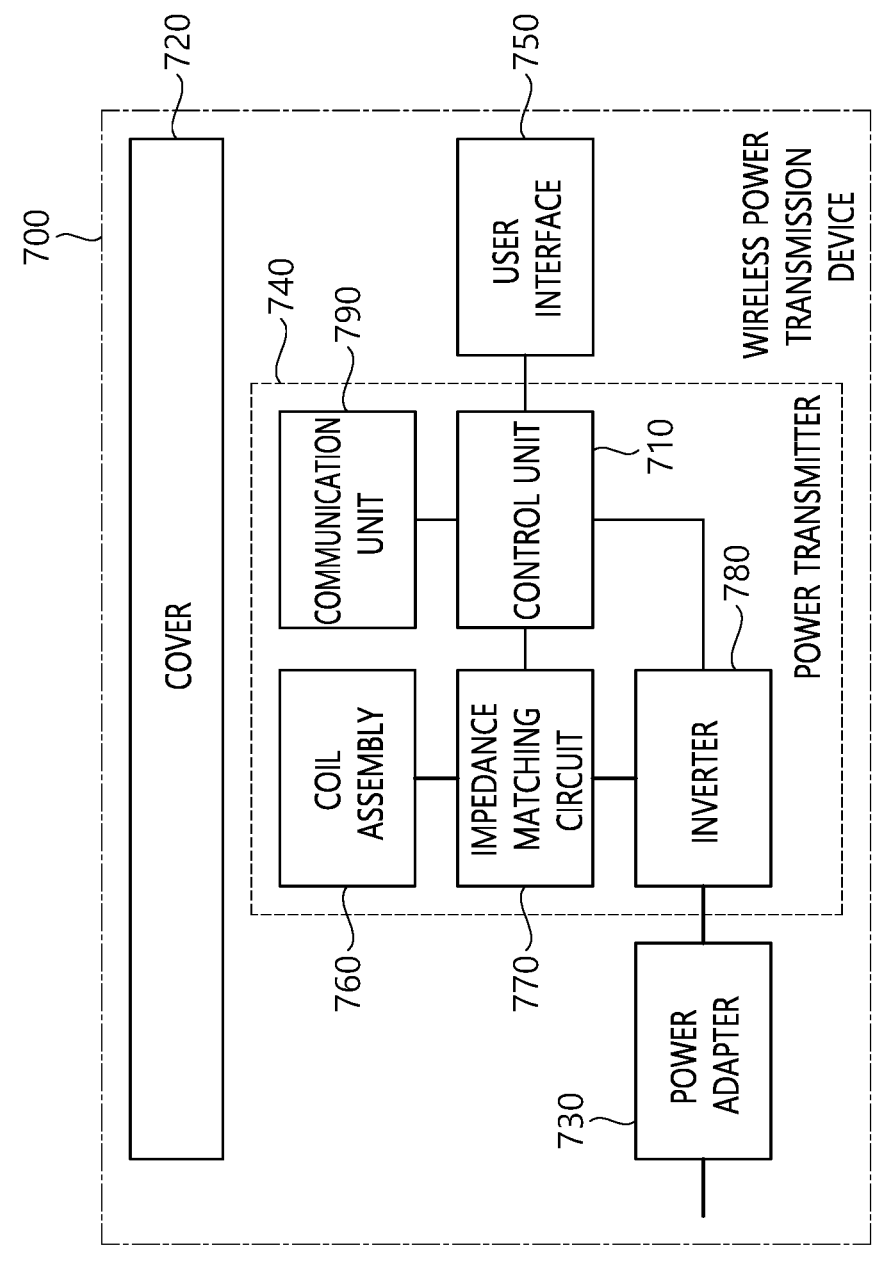
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
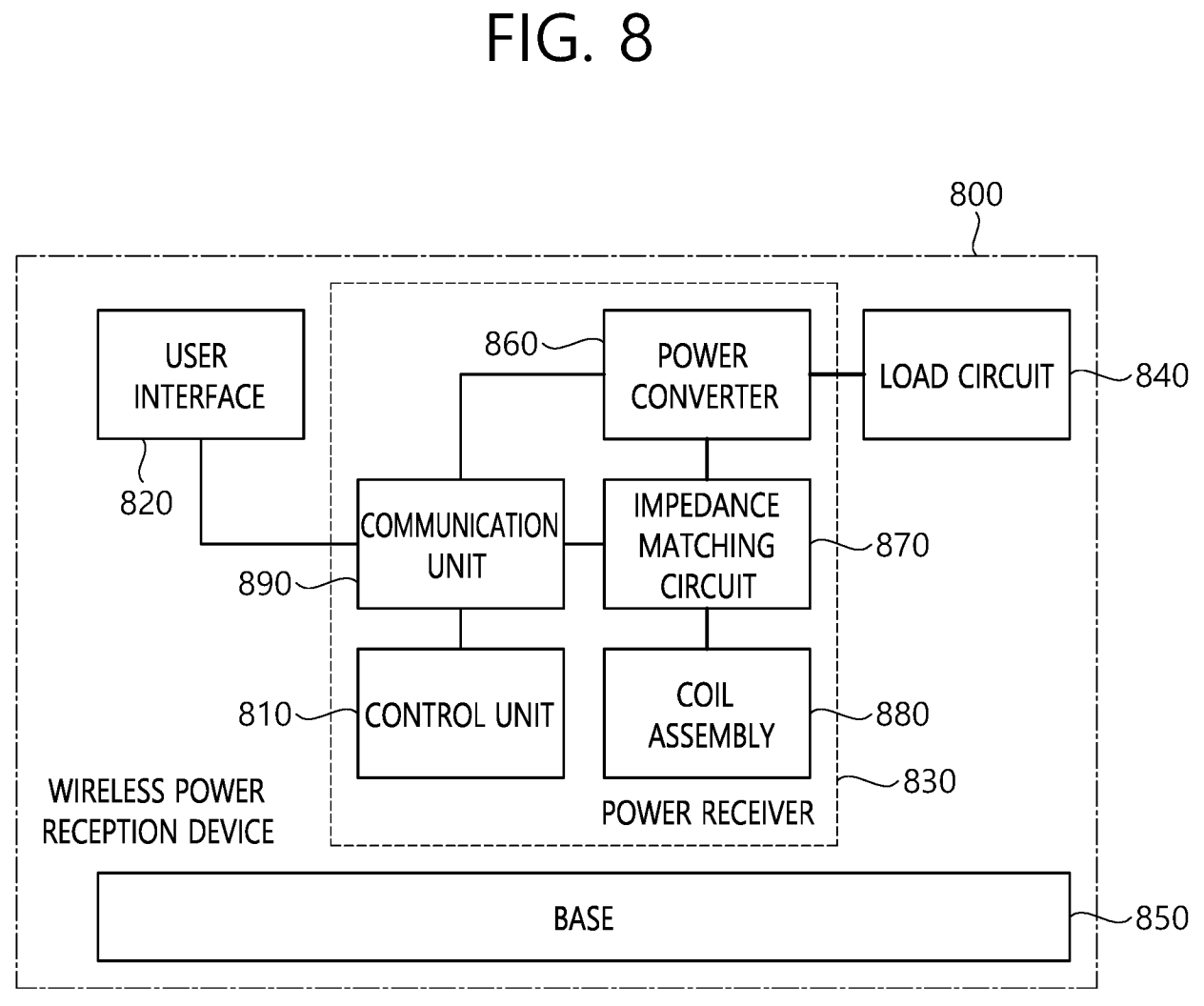

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
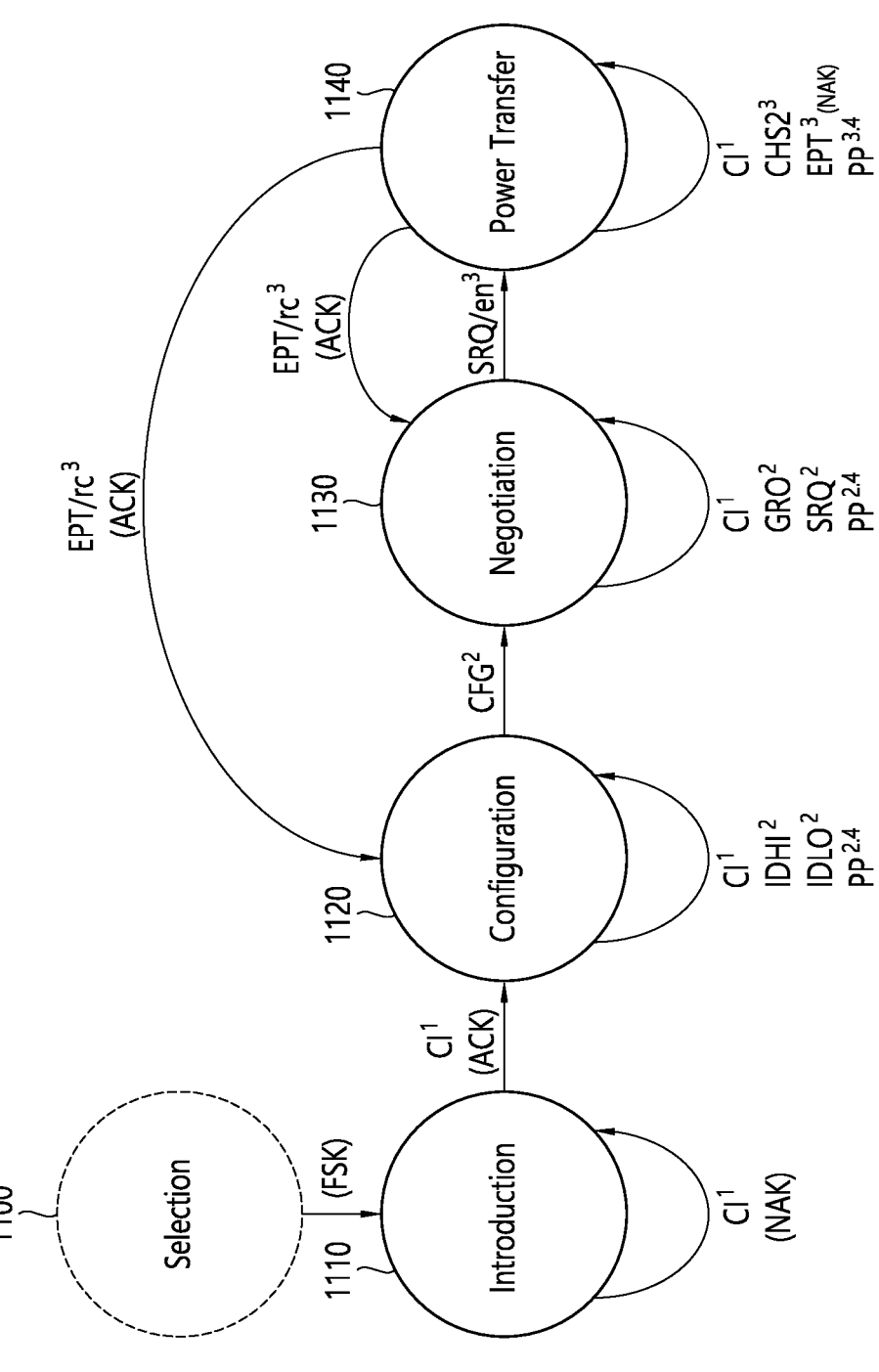
FIG. 9 illustrates an operating state of a wireless power transmitter and a wireless power receiver according to an embodiment.

FIG. 9 illustrates an operating state of a wireless power transmitter and a wireless power receiver according to an embodiment.

Referring to FIG. 9, a wireless power receiver operating in shared mode, it can operate in any one of the states of Selection Phase (1100), Introduction Phase 1110, Configuration Phase (1120), Negotiation Phase 1130 and Power Transfer Phase (1140).

First, the wireless power transmitter according to an embodiment may transmit a wireless power signal to detect the wireless power receiver. That is, the process of detecting the wireless power receiver using the wireless power signal may be referred to as analog ping.

Meanwhile, the wireless power receiver receiving the wireless power signal may enter the selection phase 1100. As described above, the wireless power receiver entering the selection phase 1100 may detect the presence of an FSK signal on the wireless power signal.

That is, the wireless power receiver may perform communication in either the exclusive mode or the shared mode according to the presence of the FSK signal.

More specifically, the wireless power receiver operates in a shared mode when the FSK signal is included in the wireless power signal, otherwise, it can operate in exclusive mode.

When the wireless power receiver operates in the shared mode, the wireless power receiver may enter an introduction phase 1110. In order to transmit a control information packet (CI, Control Information packet) in the configuration phase, negotiation phase and power transfer phase, in the introduction phase 1110, the wireless power receiver may transmit a control information packet to the wireless power transmitter. The control information packet may have a header and control-related information. For example, the control information packet may have a header of 0x53.

In the introduction phase 1110, the wireless power receiver attempts to request a free slot to transmit a control information (CI) packet over the following configuration, negotiation, and power transfer phases. At this time, the wireless power receiver selects a free slot and transmits the first CI packet. If the wireless power transmitter responds with ACK to the CI packet, the wireless power transmitter enters the configuration phase. If the wireless power transmitter responds with NAK, another wireless power receiver is in the process of configuring and negotiating. In this case, the wireless power receiver retries the request for a free slot.

If the wireless power receiver receives an ACK in response to the CI packet, the wireless power receiver determines the position of a private slot in the frame by counting the remaining slot sinks up to the first frame sink. In all subsequent slot-based frames, the wireless power receiver transmits the CI packet through the corresponding slot.

If the wireless power transmitter allows the wireless power receiver to proceed to the configuration phase, the wireless power transmitter provides a series of locked slots for exclusive use of the wireless power receiver. This ensures that the wireless power receiver proceeds through the configuration phase without conflicts.

The wireless power receiver transmits sequences of data packets such as two identification data packets (IDHI and IDLO) using a lock slot. After completing this step, the wireless power receiver enters the negotiation phase. In the negotiation phase, the wireless power transmitter continues to provide a lock slot for exclusive use to the wireless power receiver. This ensures that the wireless power receiver proceeds with the negotiation phase without collision.

The wireless power receiver transmits one or more negotiation data packets using the corresponding lock slot, it may be mixed with private data packets. Eventually, the sequence ends with a specific request (SRQ) packet. When the sequence is complete, the wireless power receiver enters the power transmission phase, and the wireless power transmitter stops providing the lock slot.

In the power transfer phase, the wireless power receiver transmits the CI packet using the allocated slot and receives power. The wireless power receiver may include a regulator circuit. The regulator circuit may be included in the communication/control circuit. The wireless power receiver may self-regulate the reflection impedance of the wireless power receiver through a regulator circuit. In other words, the wireless power receiver may adjust the reflected impedance in order to transmit the amount of power required by the external load. This can prevent excessive power reception and overheating.

In the shared mode, since the wireless power transmitter may not perform power adjustment in response to the received CI packet (according to the operation mode), in this case, control to prevent an overvoltage state may be required.

Figure 11:
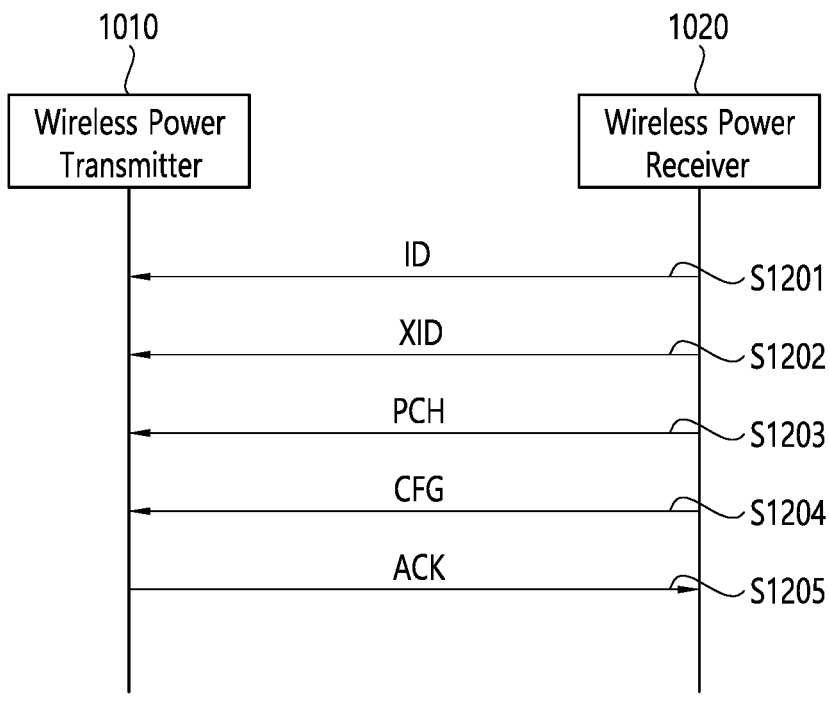
FIG. 11 is a flowchart schematically illustrating a protocol of a configuration phase according to an embodiment.

As described in FIGS. 5 and 11, etc., the wireless power transmitter and the wireless power receiver enter the power transfer phase through the Ping Phase, Configuration Phase and Negotiation Phase, or the wireless power transmitter and the wireless power receiver enter the re-negotiation phase in the power transfer phase, and when the renegotiation phase ends, the power transfer phase may be performed again. Power transfer may continue while the renegotiation phase is in progress.

Figure 10:
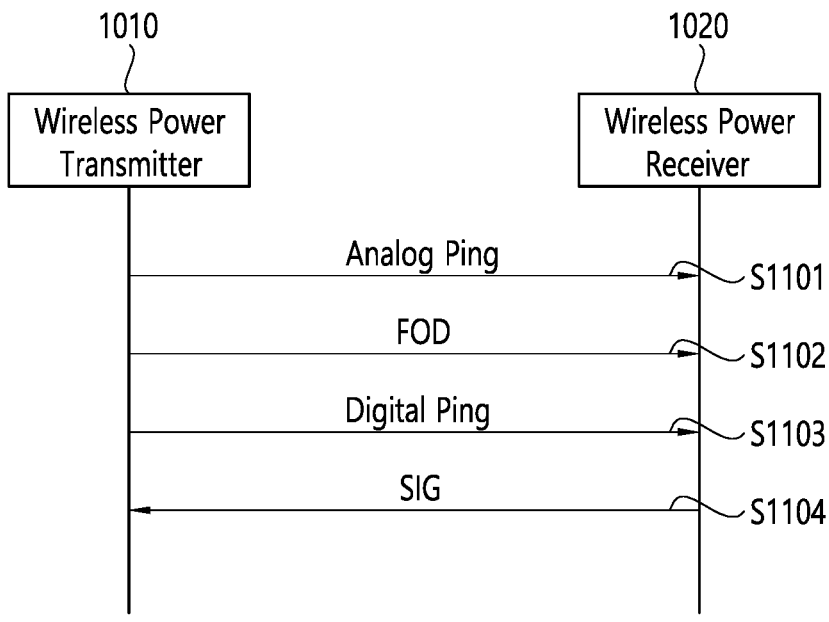
FIG. 10 is a flowchart schematically illustrating a protocol of a ping phase according to an embodiment.

FIG. 10 is a flowchart schematically illustrating a protocol of a ping phase according to an embodiment.

Referring to FIG. 10, in the ping phase, the wireless power transmitter 1010 checks whether an object exists in an operating volume by transmitting an analog ping (S1101). The wireless power transmitter 1010 may detect whether an object exists in the working space based on a change in current of a transmission coil or a primary coil.

If it is determined that an object exists in the operating volume by analog ping, the wireless power transmitter 1010 may perform foreign object detection (FOD) before power transmission to check whether a foreign object exists in the operating volume (S1102). The wireless power transmitter 1010 may perform an operation for protecting the NFC card and/or the RFID tag.

Thereafter, the wireless power transmitter 1010 identifies the wireless power receiver 1020 by transmitting a digital ping (S1103). The wireless power receiver 1020 recognizes the wireless power transmitter 1010 by receiving the digital ping.

The wireless power receiver 1020 that has received the digital ping transmits a signal strength data packet (SIG) to the wireless power transmitter 1010 (S1104).

The wireless power transmitter 1010 receiving the SIG from the wireless power receiver 1020 may identify that the wireless power receiver 1020 is located in the operating volume.

FIG. 11 is a flowchart schematically illustrating a protocol of a configuration phase according to an embodiment.

In the configuration phase (or identification and configuration phase), the wireless power receiver 1020 transmits its own identification information and configuration information to the wireless power transmitter 1010, the wireless power receiver 1020 and the wireless power transmitter 1010 may establish a baseline Power Transfer Contract.

Referring to FIG. 11, in a configuration phase, the wireless power receiver 1020 may transmit an identification data packet (ID) to the wireless power transmitter 1010 to identify itself (S1201). Also, the wireless power receiver 1020 may transmit an extended identification data packet (XID) to the wireless power transmitter 1010 (S1202). Also, the wireless power receiver 1020 may transmit a Power Control Hold-off data packet (PCH) to the wireless power transmitter 1010 for a power transmission contract or the like (S1203). Also, the wireless power receiver 1020 may transmit a configuration data packet (CFG) to the wireless power transmitter for a power transmission contract or the like (S1204).

When conforming to the extended protocol for EPP, the wireless power transmitter 1010 may transmit an ACK in response to the CFG (S1205).

The PCH may include information about $t_{delay}$. $t_{delay}$ means a delay time between a control error packet (CE) and a power level adjustment window. $T_{delay}$ is one of the elements of the basic power transfer contract. The PCH may include a 1-byte message field, and the message field of the PCH may include a $t_{delay}$/1 ms value. $t_{delay}$ may have a value of 5 ms to 100 ms.

FIG. 12 is a diagram illustrating a message field of a configuration packet (CFG) of a wireless power receiver according to an embodiment.

A configuration packet (CFG) according to an embodiment may have a header value of 0x51 and may include a 5-byte message field with reference to FIG. 12.

Referring to FIG. 12, a 1-bit authentication (AI) flag and a 1-bit out-of-band (OB) flag may be included in the message field of the configuration packet (CFG).

The authentication flag AI indicates whether the wireless power receiver 1020 supports the authentication function. For example, if the value of the authentication flag AI is '1', it indicates that the wireless power receiver 1020 supports an authentication function or operates as an authentication initiator, if the value of the authentication flag AI is '0', it may indicate that the wireless power receiver 1020 does not support an authentication function or cannot operate as an authentication initiator.

The out-band (OB) flag indicates whether the wireless power receiver 1020 supports out-band communication. For example, if the value of the out-band (OB) flag is '1', the wireless power receiver 1020 instructs out-band communication, if the value of the out-band (OB) flag is '0', it may indicate that the wireless power receiver 1020 does not support out-band communication.

In the configuration phase, the wireless power transmitter 1010 receives the configuration packet (CFG) of the wireless power receiver 1020, it can be checked whether the wireless power receiver 1020 supports the authentication function and whether the out-band communication is supported.

In addition, the message field of the configuration packet (CFG) may include information on the elements of the baseline Power Transfer Contract. Referring to FIG. 12, the message field of the configuration packet (CFG) may include information on elements of the baseline Power Transfer Contract, such as reference power, window size, window offset, and the like.

Reference Power is information related to the reference power compared with the received power received by the wireless power receiver 1020 from the wireless power transmitter 1010, and may be set to a value of $P_r^{(ref)}$/0.5 W, it can be set to a value of up to 10. That is, when the reference power $P_r^{(ref)}$ is 5 W, the reference power may be set to 10.

The window size is information related to the size of the time window for the wireless power receiver 1020 to measure the received power, and may be set to a time window (twindow)/4 ms, and may have a value of at least 2.

The window offset may be set to an integer greater than the maximum number of preamble bits (n)/8 used in a receive power packet (RP) to be described later.

In addition, the message field of the configuration packet (CFG) may include information on the elements of the extended power transfer contract. Referring to FIG. 12, the message field of the configuration packet (CFG) may include information on the elements of the fixed power transfer contract, such as FSK communication parameters such as polarity (Pol) and depth (Depth).

The wireless power transmitter 1010 and the wireless power receiver 1020 may establish a baseline Power Transfer Contract based on information included in the PCH and CFG.

Figure 13:
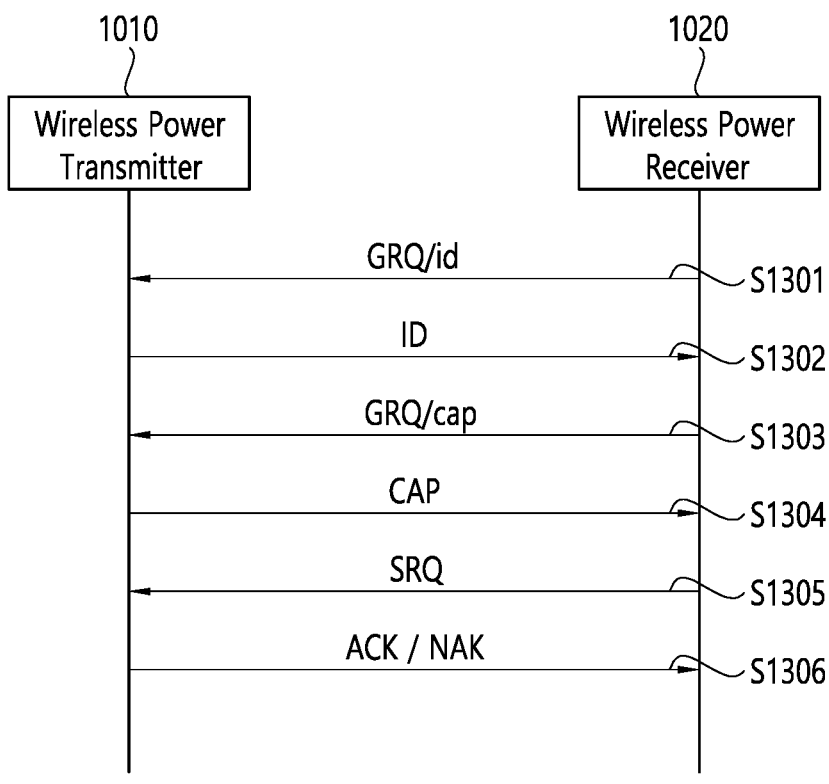
FIG. 13 is a flowchart schematically illustrating a protocol of a negotiation phase or a renegotiation phase according to an embodiment.

FIG. 13 is a flowchart schematically illustrating a protocol of a negotiation phase or a renegotiation phase according to an embodiment.

During the negotiation or renegotiation phase, the wireless power transmitter 1010 and the wireless power receiver 1020 establish an extended power transfer contract by adjusting at least some of the elements of the baseline Power Transfer Contract established in the configuration phase, or they can exchange information for establishing out-band communication.

Referring to FIG. 13, in the negotiation phase, the wireless power receiver 1020 may receive an identification data packet (ID) and a capabilities data packet (CAP) of the wireless power transmitter 1010 using a general request data packet (GRQ).

FIG. 14 is a diagram illustrating a message field of a general request packet (GRQ) of a wireless power receiver according to an embodiment.

The general request packet (GRQ) may have a header value of 0x07 and may include a 1-byte message field according to FIG. 14. The message field of the general request packet (GRQ) may include a header value of a data packet that the wireless power receiver 1020 requests from the wireless power transmitter 1010 using the GRQ packet. For example, when the wireless power receiver 1020 requests an ID packet of the wireless power transmitter 1010 using a GRQ packet, the wireless power receiver 1020 transmits a general request packet (GRQ/id) including a header value (0x30) of the ID packet of the wireless power transmitter 1010 in the message field of the general request packet (GRQ).

Referring to FIG. 13, in the negotiation phase or renegotiation phase, the wireless power receiver 1020 may transmit a GRQ packet (GRQ/id) requesting the ID packet of the wireless power transmitter 1010 to the wireless power transmitter 1010 (S1301).

The wireless power transmitter 1010 receiving the GRQ/id may transmit the ID packet to the wireless power receiver 1020 (S1302). The ID packet of the wireless power transmitter 1010 includes information on the Manufacturer Code. The ID packet including information on the Manufacturer Code allows the manufacturer of the wireless power transmitter 1010 to be identified.

Referring to FIG. 13, in the negotiation phase or renegotiation phase, the wireless power receiver 1020 may transmit a GRQ packet (GRQ/cap) requesting a capability packet (CAP) of the wireless power transmitter 1010 to the wireless power transmitter 1010 (S1303). The message field of the GRQ/cap may include a header value (0x31) of the capability packet (CAP).

The wireless power transmitter 1010 receiving the GRQ/cap may transmit a capability packet (CAP) to the wireless power receiver 1020 (S1304).

FIG. 15 is a diagram illustrating a message field of a capability packet (CAP) of a wireless power transmitter according to an embodiment.

A capability packet (CAP) according to an embodiment may have a header value of 0x31, and referring to FIG. 15, may include a message field of 3 bytes.

Referring to FIG. 15, a 1-bit authentication (AR) flag and a 1-bit out-band (OB) flag may be included in the message field of the capability packet (CAP).

The authentication flag AR indicates whether the wireless power transmitter 1010 supports the authentication function. For example, if the value of the authentication flag AR is '1', it indicates that the wireless power transmitter 1010 supports an authentication function or can operate as an authentica-tion responder, if the value of the authentication flag AR is '0', it may indicate that the wireless power transmitter 1010 does not support the authentication function or cannot operate as an authentication responder.

The out-band (OB) flag indicates whether the wireless power transmitter 1010 supports out-band communication. For example, if the value of the out-band (OB) flag is '1', the wireless power transmitter 1010 instructs out-band communication, if the value of the out-band (OB) flag is '0', it may indicate that the wireless power transmitter 1010 does not support out-band communication.

In the negotiation phase, the wireless power receiver 1020 receives the capability packet (CAP) of the wireless power transmitter 1010, it can be checked whether the wireless power transmitter 1010 supports the authentication function and whether the out-band communication is supported.

In addition, the message field of the capability packet (CAP) may include information on the elements of the extended power transfer contract. Referring to FIG. 15, the message field of the capability packet (CAP) may include information on elements of the extended power transfer contract, such as potential load power.

Potential Load Power is information related to the power of the maximum wireless power negotiable by the wireless power transmitter 1010, and may be set as potential load power $(P_L^{(pot)})/0.5$ W.

Also, referring to FIG. 13, the wireless power receiver 1020 may update the elements of the power transfer contract using at least one specific request data packet (SRQ) in the negotiation phase or the renegotiation phase, it may end the negotiation phase or the renegotiation phase (S1305).

The wireless power transmitter 1010 may transmit only ACK, only ACK or NAK, or only ACK or ND in response to the specific request packet (SRQ) according to the type of the specific request packet (SRQ) (S1306).

By transmitting information about Guaranteed Load Power $(P_L^{(gtd)})$, polarity (Pol) and/or depth (Depth) of FSK communication, ripping delay (treping), reference power $(P_r^{(ref)})$, etc. among the elements of the baseline Power Transfer Contract and/or extended power transfer contract using a specific request packet (SRQ), the wireless power receiver 1020 may negotiate an extended power transfer contract with the wireless power transmitter 1010.

Guaranteed Load Power may mean a negotiated power level, and a default value may be 5 W.

The ripping delay may mean a delay time between the EPT/rep packet and the next digital ping, and the default value may be 12.6 seconds.

In the above-described ping phase, configuration phase, and negotiation/renegotiation phase, a data packet or message exchanged between the wireless power transmitter 1010 and the wireless power receiver 1020 may be transmitted/received through in-band communication.

In the power transfer phase, the wireless power transmitter 1010 and the wireless power receiver 1020 may transmit/receive wireless power based on the extended power transfer contract established in the negotiation phase. The wireless power transmitter 1010 and the wireless power receiver 1020 may control the amount of transmitted power by performing communication together with power transmission/reception.

In the power transfer phase, the wireless power transmitter 1010 and/or the wireless power receiver 1020 may re-enter the negotiation phase to renew a power transfer contract.

Since other details of the ping phase, configuration phase, negotiation phase, and power transfer phase have been described with reference to FIGS. 5 and 9, an additional description thereof will be omitted.

Figure 16:
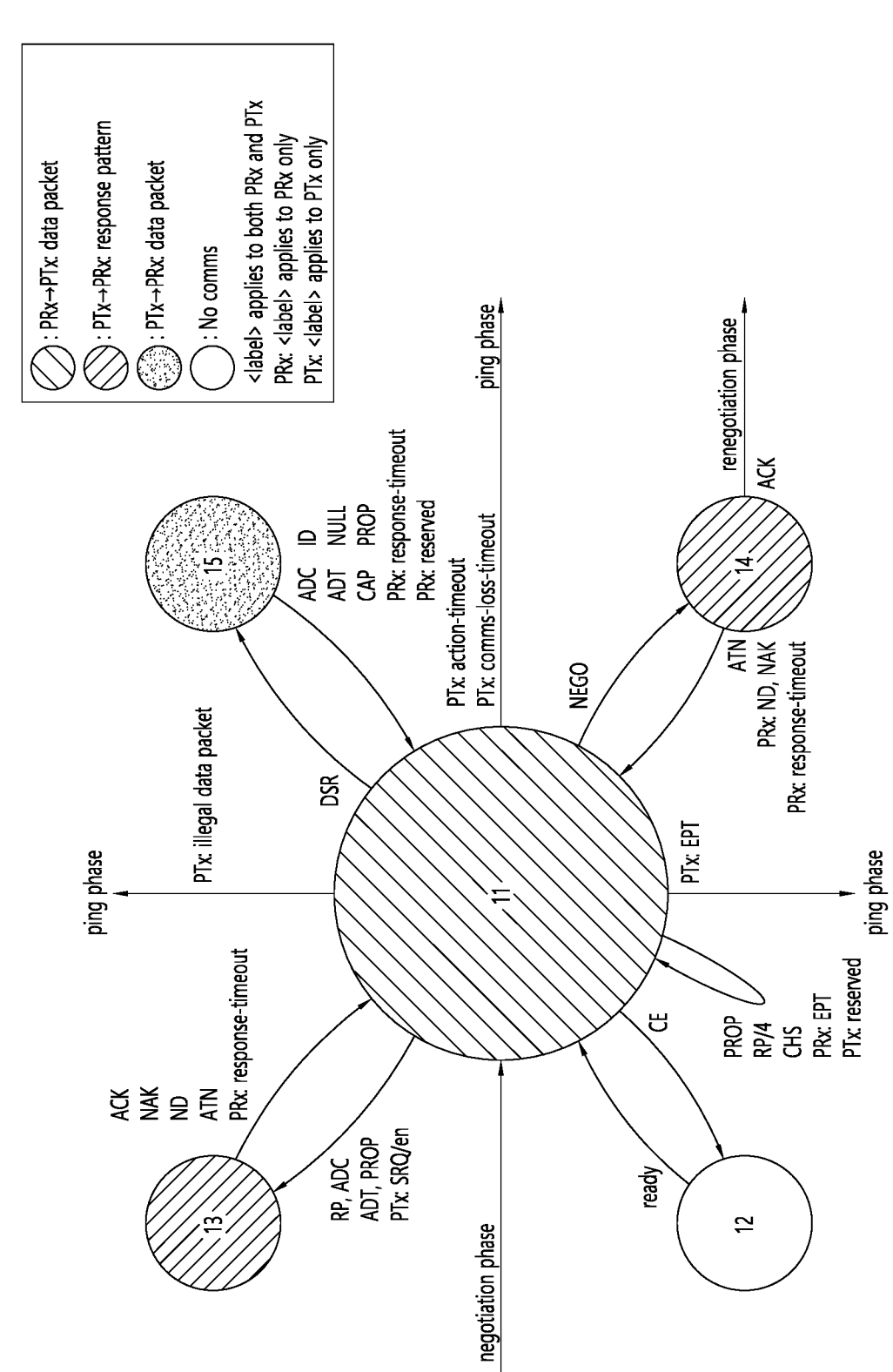
FIG. 16 is a diagram showing a state diagram of a power transfer phase according to the conventional Qi standard.

FIG. 16 is a diagram showing a state diagram of a power transfer phase according to the conventional Qi standard.

In a power transfer phase according to the conventional Qi standard, a wireless power receiver could not receive a data packet of a desired wireless power transmitter.

Referring to FIG. 16, there is a state (State 15) in which the wireless power transmitter transmits a data packet to the wireless power receiver in the power transfer phase, this is just a step for the wireless power transmitter to transmit the data packet the wireless power transmitter wants to transmit in response to the DSR (Data Stream Response) packet, a protocol for receiving a specific data packet from a wireless power transmitter by specifying a data packet desired by the wireless power receiver is not defined.

According to the conventional Qi standard, in order for a wireless power receiver to receive a desired specific data packet from a wireless power transmitter, the wireless power receiver had to enter a re-negotiation phase and transmit a general request packet (GRQ) to the wireless power transmitter.

However, in order to enter the re-negotiation phase from the power transfer phase, the wireless power receiver transmits a NEGO packet requesting entry into a re-negotiation phase, receives a response (ACK or ATN) to the NEGO packet from the wireless power transmitter and enters the re-negotiation phase.

In case of receiving ACK in response to the NEGO packet, it enters the re-negotiation phase immediately, the wireless power receiver may receive a desired data packet by transmitting a general request packet (GRQ) to the wireless power transmitter.

However, when ATN is received in response to the NEGO packet, the re-negotiation phase cannot be entered immediately. The wireless power receiver transmits a DSR/poll packet to give the wireless power transmitter a communication opportunity, it is converted to State 15 of FIG. 16. Therefore, only after receiving and processing the data packet transmitted by the wireless power transmitter, it is possible to attempt to enter the re-negotiation phase by transmitting the NEGO packet again.

That is, according to the current Qi standard, in order to receive a specific data packet desired by the wireless power receiver from the wireless power transmitter, the wireless power receiver is accompanied by the hassle of entering the re-negotiation phase, when the wireless power receiver responds with ATN to the NEGO packet requesting entry into the re-negotiation phase, there are also situations where it is difficult to enter the re-negotiation phase immediately.

In the power transfer phase, if the existence of a foreign object is suspected, such as a decrease in received power, the wireless power receiver wants to quickly receive a report on the possibility of foreign object existence from the wireless power transmitter, or for renegotiation of the power transfer contract, it may be desired to check the negotiable load power and/or potential load power of the wireless power transmitter.

However, according to the current Qi standard, a wireless power receiver can check the above information only when it enters a re-negotiation phase from a power transfer phase.

Accordingly, the present specification proposes a protocol capable of receiving a specific data packet desired by a wireless power receiver from a wireless power transmitter without entering a re-negotiation phase from a power transfer phase.

Figure 17:
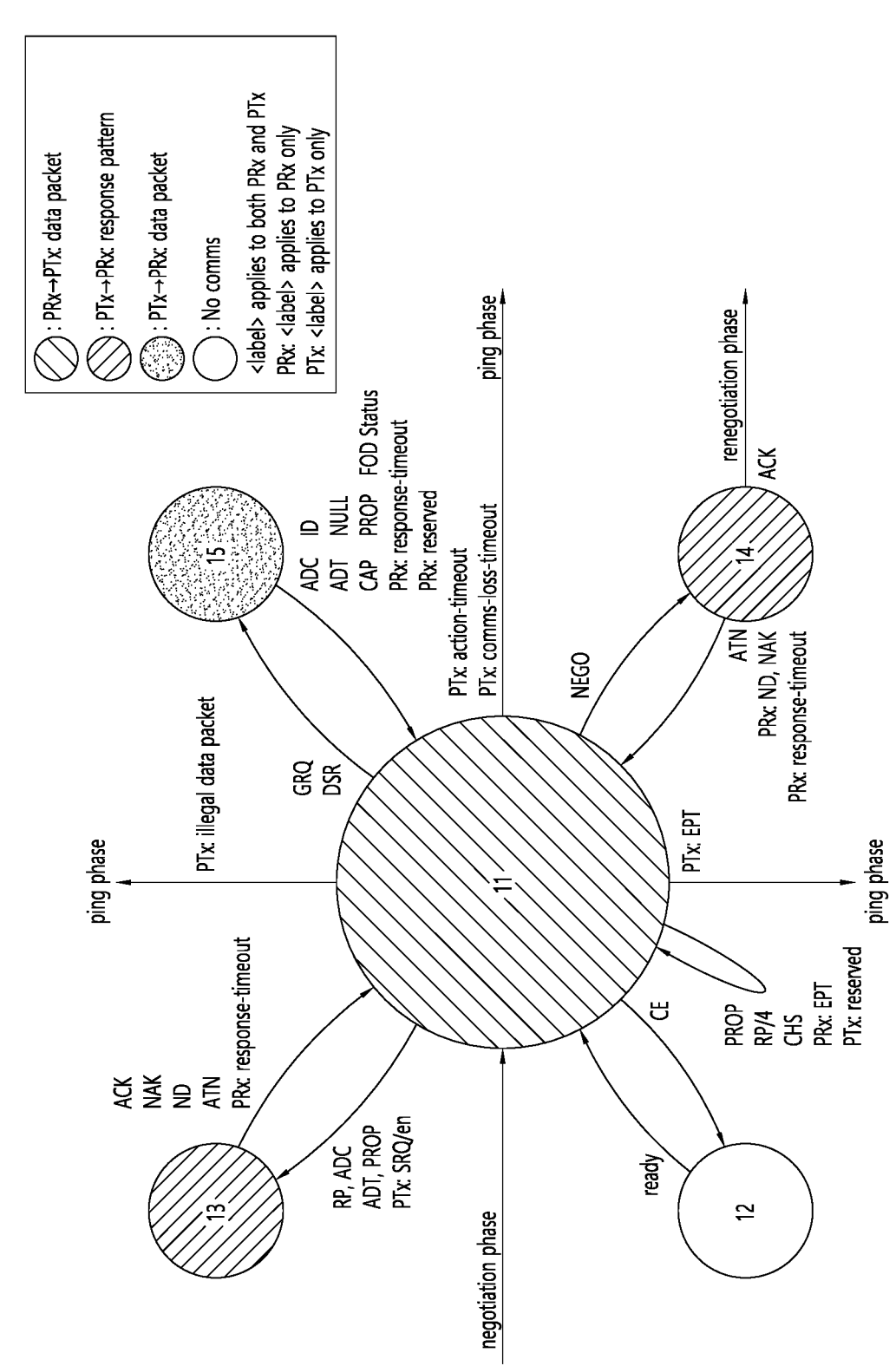
FIG. 17 is a diagram illustrating a state diagram of a power transfer phase according to an embodiment.

FIG. 17 is a diagram illustrating a state diagram of a power transfer phase according to an embodiment.

Referring to FIG. 17, according to the protocol of the power transfer phase according to this embodiment, the wireless power receiver may transmit a general request packet (GRQ) even in the power transfer phase (According to the conventional Qi standard, the wireless power receiver could transmit the general request packet (GRQ) only in the negotiation phase or re-negotiation phase).

In a power transfer phase, the wireless power receiver may transmit a general request packet (GRQ) including a header value of a data packet of a wireless power transmitter that wants to be received to the wireless power transmitter.

The wireless power transmitter receiving the general request packet (GRQ) in the power transfer phase checks the message field of the general request packet (GRQ), the data packet having the header value indicated by the value of the message field is transmitted to the wireless power receiver.

Figure 18:
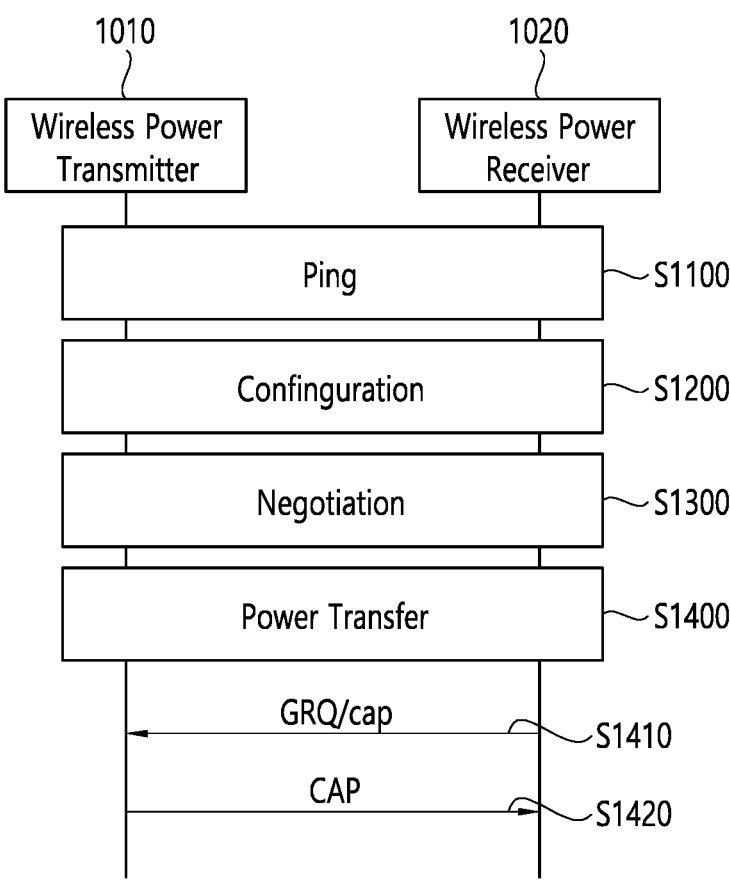
FIG. 18 is a flowchart illustrating a protocol for receiving a capability packet (CAP) from a wireless power transmitter in a power transfer phase.

FIG. 18 is a flowchart illustrating a protocol for receiving a capability packet (CAP) from a wireless power transmitter in a power transfer phase.

Referring to FIG. 18, the wireless power transmitter 1010 and the wireless power receiver 1020 may enter a power transfer phase (S1400) through a ping phase (S1100), a configuration phase (S1200), and a negotiation phase (S1300).

In the power transfer phase (S1400), to request the capability packet (CAP) of the wireless power transmitter 1010, the wireless power receiver 1020 may transmit a general request packet (GRQ/cap) including a header value (0x31) of the capability packet (CAP) in a message field to the wireless power transmitter 1010 (S1410).

Before entering the re-negotiation phase, to check whether the current power transfer contract can be adjusted, the wireless power receiver 1020 may request a capability packet (CAP) from the wireless power transmitter 1010.

When the message field of the general request packet (GRQ) received in the power transfer phase (S1400) indicates the header value (0x31) of the capability packet (CAP), the wireless power transmitter 1010 transmits a capability packet (CAP) (S1420).

The wireless power receiver 1020 checks the negotiable load power and/or potential load power included in the capability packet (CAP) received from the wireless power transmitter 1010, checks in advance whether the power transfer contract can be adjusted, it can determine whether to enter the re-negotiation phase.

Figure 19:
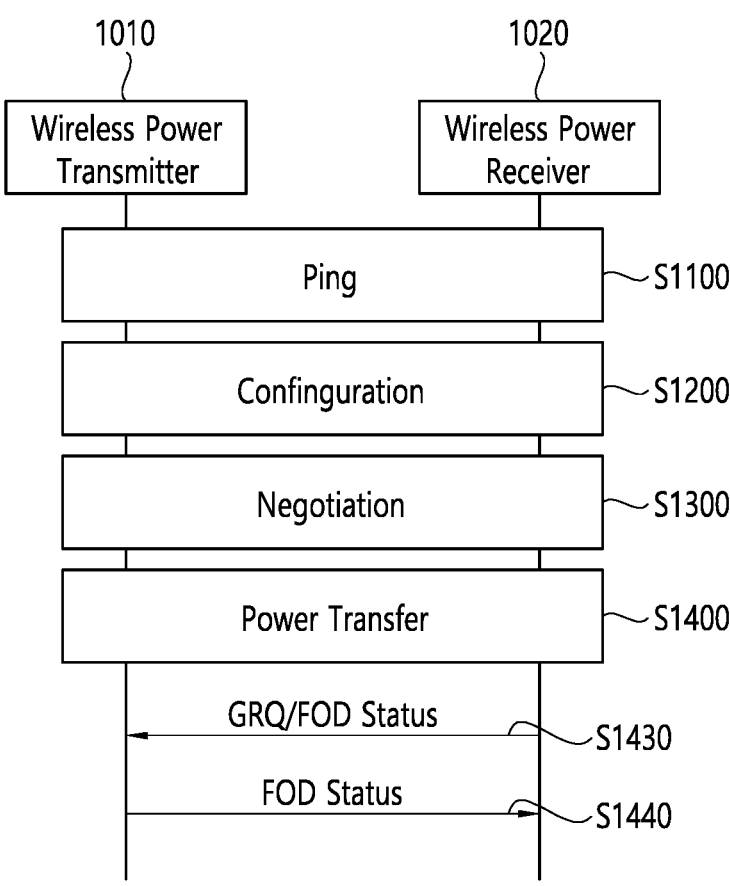
FIG. 19 is a flowchart illustrating a protocol for receiving a foreign object detection status packet (FOD status) from a wireless power transmitter in a power transfer phase.

Meanwhile, FIG. 19 is a flowchart illustrating a protocol for receiving a foreign object detection status packet (FOD status) from a wireless power transmitter in a power transfer phase.

Referring to FIG. 19, the wireless power transmitter 1010 and the wireless power receiver 1020 may enter a power transfer phase (S1400) through a ping phase (S1100), a configuration phase (S1200), and a negotiation phase (S1300).

In the power transfer phase (S1400), the wireless power receiver 1020 requests a foreign object detection status packet (FOD status) of the wireless power transmitter 1010, a general request packet (GRQ/FOD status) including a header value (0x01) of the foreign object detection status packet (FOD status) in the message field may be transmitted to the wireless power transmitter 1010 (S1430).

FIG. 20 is a diagram illustrating a message field of a foreign object detection status packet (FOD status) of a wireless power transmitter according to an example.

Referring to FIG. 20, a message field of a foreign object detection status packet (FOD status) may consist of 1 byte and may include a foreign object existence possibility field expressing the foreign object existence possibility with 3 bits.

In this case, the possibility of foreign object existence can be divided into 8 levels, and in the case of '000' bit, it means that there is no foreign object, in the case of '111' bit, it means that the possibility of existence of a foreign object is almost certain. The higher the value represented by 3 bits, the higher the possibility of foreign object existence.

The wireless power receiver 1020 may suspect that a foreign object exists between the wireless power receiver 1020 and the wireless power transmitter 1010 when the received power decreases. Accordingly, the wireless power receiver 1020 may request a foreign object detection status packet (FOD status) of the wireless power transmitter 1010 in order to check the existence possibility of a foreign object.

When the message field of the general request packet (GRQ) received in the power transfer phase (S1400) indicates the header value (0x01) of the foreign object detection status packet (FOD status), the wireless power transmitter 1010 transmits a foreign object detection status packet (FOD status) (S1440).

The wireless power receiver 1020 checks information about the existence of a foreign object included in the foreign object detection status packet (FOD status) received from the wireless power transmitter 1010, depending on the possibility of a foreign object, use an EPT packet to request the cessation of power transfer, or the power of the received power may be lowered and power correction may be performed.

As described above, according to the present specification, the wireless power receiver can specify a data packet desired by the wireless power receiver using the general request packet (GRQ) and request the wireless power transmitter even in the power transfer phase. Accordingly, a specific data packet may be received so that the wireless power receiver does not enter the re-negotiation phase from the power transfer phase in order to receive the desired specific data packet. This allows the wireless power receiver to acquire desired information more quickly in the power transfer phase, as a result, it enables safer and more efficient transmission/reception of wireless power.

The wireless power transmitter in the embodiment according to the above-described FIGS. 12 to 20 corresponds to the wireless power transmitter or the wireless power transmitter or the power transmitter disclosed in FIGS. 1 to 11. Accordingly, the operation of the wireless power transmitter in this embodiment is implemented by one or a combination of two or more of each component of the wireless power transmitter in FIGS. 1 to 11. For example, the reception/transmission, control function, and power transmission method of the message or data packet according to FIGS. 12 to 20 are included in the operation of the communication/control unit 120, 710 or 790.

The wireless power receiver in the embodiment according to the above-described FIGS. 12 to 20 corresponds to the wireless power receiver or the wireless power receiver or the power receiver disclosed in FIGS. 1 to 11. Accordingly, the operation of the wireless power receiver in this embodiment is implemented by one or a combination of two or more of the respective components of the wireless power receiver in FIGS. 1 to 11. For example, the reception/transmission, control function, and power reception method of the message or data packet according to FIGS. 12 to 20 may be included in the operation of the communication/control unit 220, 810, or 890.

Since all components or steps are not essential for the wireless power transmission method and apparatus, or the reception apparatus and method according to the embodiment of the present document described above, an apparatus and method for transmitting power wirelessly, or an apparatus and method for receiving power may be performed by including some or all of the above-described components or steps. In addition, the above-described wireless power transmission apparatus and method, or the embodiment of the reception apparatus and method may be performed in combination with each other. In addition, each of the above-described components or steps is not necessarily performed in the order described, and it is also possible that the steps described later are performed before the steps described earlier.

The above description is merely illustrative of the technical idea of the present document, those of ordinary skill in the art to which the present document pertains will be able to make various modifications and variations without departing from the essential characteristics of the present document. Accordingly, the embodiments of the present document described above may be implemented separately or in combination with each other.

Accordingly, the embodiments disclosed in the present document are not intended to limit the technical spirit of the present document, but to explain, and the scope of the technical spirit of the present document is not limited by these embodiments. The protection scope of the present document should be construed by the following claims, all technical ideas within the scope equivalent thereto should be construed as being included in the scope of the present document.

What is claimed is:

1. A method for transferring wireless power, the method performed by a wireless power transmitter and comprising:
   transmitting a digital ping to a wireless power receiver;
   after transmitting the digital ping, receiving a signal strength (SIG) packet from the wireless power receiver;
   after receiving the SIG packet, receiving a configuration (CFG) packet from the wireless power receiver;
   after receiving the CFG packet, performing a negotiation phase to negotiate a power transfer contract element; and
   after performing the negotiation phase, entering a power transfer phase;
   wherein, in the power transfer phase,
   a request packet requesting a specific packet is received from the wireless power receiver,
   the specific packet is transmitted to the wireless power receiver in response to the request packet.

2. The method of claim 1, wherein the request packet includes a header value of the specific packet.

3. The method of claim 1, wherein the specific packet is a packet including information on negotiable load power of the wireless power transmitter.

4. The method of claim 1, wherein the specific packet is a packet including information on potential load power of the wireless power transmitter.

5. The method of claim 1, wherein the specific packet is a foreign object detection status packet including information on a foreign object detection result.

6. A wireless power transmitter, comprising:

a power converter configured to transfer wireless power to a wireless power receiver by magnetic coupling with the wireless power receiver at an operating frequency; and a controller configured to communicate with the wireless power receiver and to control the transfer of the wireless power, wherein the controller is configured to:

transmit a digital ping to the wireless power receiver;

after transmitting the digital ping, receive a signal strength (SIG) packet from the wireless power receiver;

after receiving the SIG packet, receive a configuration (CFG) packet from the wireless power receiver;

after receiving the CFG packet, perform a negotiation phase to negotiate a power transfer contract element; and after performing the negotiation phase, enter a power transfer phase;

wherein, in the power transfer phase, a request packet requesting a specific packet is received from the wireless power receiver, the specific packet is transmitted to the wireless power receiver in response to the request packet.

7. The wireless power transmitter of claim 6, wherein the request packet includes a header value of the specific packet.

8. The wireless power transmitter of claim 6, wherein the specific packet is a packet including information on negotiable load power of the wireless power transmitter.

9. The wireless power transmitter of claim 6, wherein the specific packet is a packet including information on potential load power of the wireless power transmitter.

10. The wireless power transmitter of claim 6, wherein the specific packet is a foreign object detection status packet including information on a foreign object detection result.

11. A method for receiving wireless power, the method performed by a wireless power receiver and comprising:

receiving a digital ping from a wireless power transmitter;

after receiving the digital ping, transmitting a signal strength (SIG) packet to the wireless power transmitter;

after transmitting the SIG packet, transmitting a configuration (CFG) packet to the wireless power transmitter;

after transmitting the CFG packet, performing a negotiation phase to negotiate a power transfer contract element; and after performing the negotiation phase, entering a power transfer phase;

wherein, in the power transfer phase, a request packet requesting a specific packet is transmitted to the wireless power transmitter, the specific packet is received from the wireless power transmitter in response to the request packet.

12. The method of claim 11, wherein the request packet includes a header value of the specific packet.

13. The method of claim 11, wherein the specific packet is a packet including information on negotiable load power of the wireless power transmitter.

14. The method of claim 11, wherein the specific packet is a packet including information on potential load power of the wireless power transmitter.

15. The method of claim 11, wherein the specific packet is a foreign object detection status packet including information on a foreign object detection result.

* * * * *